United States Patent [19]
Hochstrasser

[11] Patent Number: 5,454,396
[45] Date of Patent: Oct. 3, 1995

[54] SANITARY SAFETY DEVICE FOR PREVENTING THE BACKFLOW OF WATER

[75] Inventor: Ferdinand Hochstrasser, Auenstein, Switzerland

[73] Assignee: KWC AG, Unterkulm, Switzerland

[21] Appl. No.: 247,765

[22] Filed: May 23, 1994

[30] Foreign Application Priority Data

Aug. 17, 1993 [CH]  Switzerland ............... 02446/93

[51] Int. Cl.⁶ .................. E03C 1/10; F16K 24/02
[52] U.S. Cl. ............................ 137/218; 137/801
[58] Field of Search ...................... 137/218, 801

[56] References Cited

U.S. PATENT DOCUMENTS

| | | |
|---|---|---|
| 2,270,737 | 1/1942 | Langdon . |
| 2,382,427 | 8/1945 | Langdon . |
| 2,675,823 | 4/1954 | Langdon . |
| 2,938,532 | 5/1960 | Fraser ................. 137/218 |

FOREIGN PATENT DOCUMENTS

| | | |
|---|---|---|
| 0284805 | 10/1988 | European Pat. Off. . |
| 0294549 | 12/1988 | European Pat. Off. . |
| 0432553 | 6/1991 | European Pat. Off. . |
| 0447777 | 9/1991 | European Pat. Off. . |
| 1011732 | 7/1957 | Germany . |
| 3832998 | 4/1990 | Germany . |
| 9113239 | 2/1992 | Germany . |
| 344598 | 3/1960 | Switzerland . |

Primary Examiner—Gerald A. Michalsky
Attorney, Agent, or Firm—Oblon, Spivak, McClelland, Maier & Neustadt

[57] ABSTRACT

In a valve space surrounded by a housing is arranged a sleeve-shaped valve body made of elastomeric material. The valve body is fastened with a fastening end thereof to the housing, and a flow channel thereof is flow-connected to an inlet orifice. The valve body bears, with a middle portion of the valve body spanning a ventilation orifice, on a ventilation-valve seat formed on the housing. There adjoins the middle portion a bead which the end portion, bearing under prestressing on the valve-seat element, adjoins on the other hand. With water flowing in the direction of flow and also with an equal pressure prevailing on the inlet side and outlet side, the valve body bearing on the ventilation-valve seat prevents the outflow of water through the ventilation orifice. With a negative pressure prevailing on the feed side, the middle portion lifts off from the ventilation-valve seat, in order to ventilate the outlet orifice.

12 Claims, 3 Drawing Sheets

SANITARY SAFETY DEVICE FOR PREVENTING THE BACKFLOW OF WATER

BACKGROUND OF THE INVENTION

1. Field of the Invention

The present invention relates to a sanitary safety device, especially for a sanitary fitting, for preventing the backflow of water into a feed conduit.

2. Discussion of the Background

Safety devices of this type are known from U.S. Pat. Nos. 2,270,737 and 2,382,427. They are provided in order to be installed in toilet flushing devices between the flushing cock and the flushing pipe leading to the toilet. They are installed in a vertical direction and at a considerable vertical distance above the dirty water which is possibly present in the toilet bowl and which could be sucked back. In flushing devices of this type, therefore, in the event of low negative pressures prevailing on the feed side, there is no risk that dirty water will pass into the feed conduit. The known safety devices consequently have to function reliably only in the event of a considerable negative pressure prevailing on the feed side.

The safety devices known from the publications mentioned have a sleeve-shaped valve body made of elastomeric material, which is arranged inside a tubular housing and which is fastened by means of its fastening end located on the inlet side to an inner flange of the housing. The valve body engages around a bell-shaped thin-walled valve-seat element, of which the bottom region facing the inlet of the housing is fastened to a web-like supporting member which is itself supported fixedly relative to the housing. The valve-seat element cooperates, by means of its flank end region located downstream, with a free end portion of the valve body, said end portion being widened in a bell-like manner and being remote from the fastening end, the rim of the valve-seat element being set back relative to the free end of the valve body. The housing has a second inner flange which is intended for cooperating with the outside of the end portion of the valve body when water flows through the latter, in order to separate the ventilation orifices, present above the second inner flange, as seen in the direction of flow of the water, and connected to the ambient air, from the outlet orifice of the housing. When no water flows through the safety device and no negative pressure prevails on the inlet side, the valve-seat element is on the valve body, and between the latter and the second inner flange there is a ring-like ventilation gap which connects the ventilation orifices to the outlet orifice in terms of flow. Under these conditions, the outlet orifice is therefore ventilated. When water flows, under the pressure of the water, on the one hand the valve body expands and is laid with its end portion against the second inner flange, and on the other hand the valve-seat element is bent inward in the direction of flow and in the radial direction, thus necessarily leading to folding or kinking in the valve-seat element. Under the negative pressure prevailing on the feed side, the valve body and the valve-seat element are pressed against one another as a result of the squeezing suction pressure, the trickling gap between the valve body and the inner flange of the housing remaining open, in order to ventilate the outlet orifice.

These known safety devices are designed for the high throughflow quantities per unit of time necessary for the flushing of toilets, but would seem not to have a reliable operating behavior for only small water quantities flowing through and not to be suitable for purposes other than use in toilet flushing devices. Since the expansion of the valve body would seem to require more force than the inward folding of the thinwalled valve-seat element, with small throughflow quantities there is no guarantee that the valve body will be laid with its end portion against the second inner flange of the housing. Under these operating conditions, therefore, should water be capable of flowing back on the outlet side, there is the risk that this water can escape through the ventilation orifices. Furthermore, the valve body should not bear under a prestressed condition on the valve-seat element, because it would then no longer be guaranteed that, after the interruption of the water flow, the valve-seat element folded inward by flowing water will be laid flush against the valve body again, because the folded valve-seat element cannot exert the force to expand the valve body correspondingly. Moreover, known safety devices are, for example, unsuitable to be used in hose-type shower fittings, since there, when the water flow is interrupted, water trapped in the shower hose can escape through the ventilation orifices when the shower is lifted, and this is not permissible, particularly in kitchen fittings of this type.

An object of the present invention is, therefore, to provide a safety device of the relevant generic type, which can be used universally and which functions in a reliably safe manner under all operating conditions. This object is achieved by means of the safety device of the present invention.

Since the valve body, in a state of rest, that is to say with equal pressure on the inlet side and on the outlet side, bears on the ventilation-valve seat and thus separates the ventilation orifices from the outlet orifice, the outflow of water through the ventilation orifice is prevented even when the water flow coming from the feed conduit is interrupted. Since the valve-seat element is of a fold-resistant and kink-resistant design and the valve body bears on the latter under prestressing in a sleeve-like manner, it is always necessary, with water flow, however small, coming from the feed conduit, for the valve-seat element to expand in order to release the water flow between it and the valve-seat element. Thus, in the event of water flow, the pressure is always higher upstream of the valve-seat element in the flow channel enclosed by the valve body than underneath the valve-seat element in the direction of flow, thereby always ensuring, even under these conditions, that the valve body bears on the ventilation-valve seat and prevents the outflow of water through the ventilation orifice. However, a continuous bead guarantees that, even under a low negative pressure prevailing on the feed side, the valve body lifts off immediately from the ventilation-valve seat and allows for ventilation of the outlet orifice. This bead makes it possible to contract the valve body in the radial direction, without the latter at the same time having to expand in the axial direction. The length compensation takes place with very little effort by means of the bead.

In an especially preferred embodiment of the present invention, the risk that, with water flowing in from the outlet side, the valve body can peel off from the valveseat element is reduced.

A further preferred embodiment affords reliably safe functioning, even if a foreign body were to penetrate between the valve-seat element and the valve body. The prestress of the valve body and, in particular, the design of the valve body and of the valve-seat element in the manner of a sealing lip ensure that the foreign body is tightly enclosed.

The likewise additional preferred embodiments of the safety device according to the invention afford a particularly simple construction and allow for extremely simple assembly.

A further advantageous embodiment makes it possible to support the valve body carefully when water is supplied at high pressure. The arrangement of a supporting and holding sleeve ensures that the radial widening of the valve body is limited and the risk of damage to the valve body is eliminated. Moreover, an especially simple assembly can likewise be brought about.

Especially preferred sanitary fittings having the safety device according to the invention are also part of the present invention.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
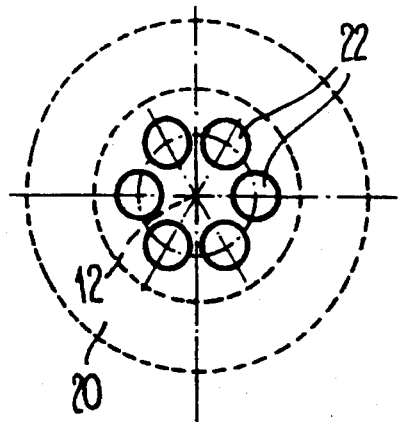
FIGS. 1 and 2 show a first embodiment of the safety device according to the invention in a top view and a longitudinal sectional view, respectively.
Figure 2:
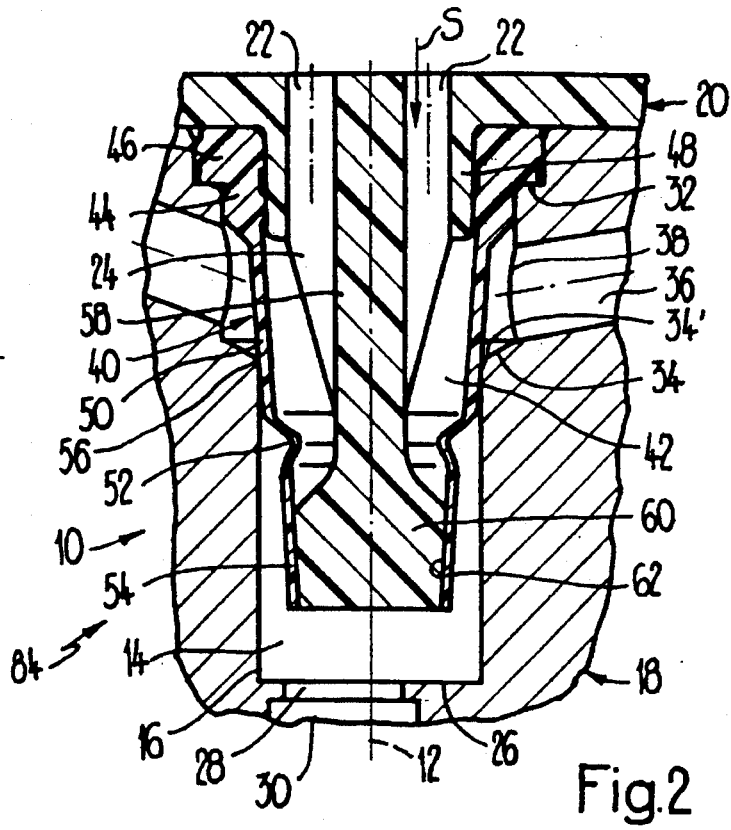

The safety device shown in FIGS. 1 and 2 has a housing 10 which surrounds a valve space 14 which is essentially rotationally symmetrical relative to an axis 12. The valve space 14 is formed by a blind-hole-like recess 16 which is located in a housing body 18 and which is spanned by a cover element 20. The cover element 20 has a plurality of passage holes 22 which extend in the direction of the axis 12 and are arranged circularly about the axis 12 and which form an inlet orifice 24 of the valve space 14. The inlet orifice 24 is intended to be connected to a feed line, as is to be described further below in respect of FIG. 4. In the bottom 26 of the recess 16 located opposite the cover element 20, there is an outlet orifice 28, to which is connected an outflow channel 30 which terminates in a water flow-off, for example in the form of a sprinkler or a showerhead. As seen from the cover element 20, the recess 16 has a first step-like narrowing 32 and, spaced from the latter in the axial direction, a second step-like narrowing 34. Between these two narrowings 32, 34, ventilation channels 36 formed in the housing body 18 open into the recess 16. These are connected to the ambient air, and their openings into the recess 16 form a ventilation orifice 38 of the valve space 14.

In the valve space 14, there is a sleeve-like valve body 40 made of elastomeric material, which is rotationally symmetrical relative to the axis 12 and which surrounds a flow channel designated by reference number 42. At its fastening end 44 located on the inlet side and facing the cover element 20, the valve body 40 has a fastening bolster 46 which projects outward in the radial direction and which, in order to fasten the valve body 40, is held clamped between the shoulder of the first narrowing 32 and the cover element 20. Furthermore, the cover element 20 has a tenon or projecting part 48 which engages into the valve body 40 and through which the passage holes 22 run into the flow channel 42 and which prevents the fastening bolster 46 from slipping out of the fastening groove formed by the housing body 18 and the cover element 20.

The fastening bolster 46 is adjoined by a thin-walled middle portion 50 which tapers conically, as seen in the direction of flow S, and which spans the ventilation orifice 38 and, as seen in the direction of flow S, is limited below the second narrowing 34 by a continuous bead 52 directed inward. The bead 52 is adjoined downstream by a thin-walled free-ending end portion 54, likewise tapering conically.

The valve body 40 is designed in such a way that, in the mounted state, it bears with its middle portion 50 on the housing body 18 in a continuous region adjoining the shoulder 34, forming the second narrowing 34. This region constitutes a ventilation-valve seat 56 cooperating with the valve body 40.

Formed on the tenon part 48 of the cover element 20 is a shank-like holding part 58 which extends a radial distance from the middle portion 50 and from the bead 52 of the valve body 40 in the outflow channel 30 into the end portion 54 of the valve body 40 and which is widened there to form a valve-seat element 60. This has an outer surface 62 which tapers conically, as seen in the direction of flow S, and on which the valve body 40 bears under prestressing with its end portion 54. This prestressing is generated as a result of the spring properties of the elastomeric material of the valve body 40, the end portion 54 of which is held expanded in the circumferential direction by the valve-seat element 60. Since the valve-seat element 60 is designed in the manner of a solid body, it cannot fold up or buckle.

It may be mentioned for the sake of completeness that the valve body 40 terminates at the free end of the valve-seat element 60, and this end is spaced from the bottom 26 in the axial direction. Furthermore, there is a radial distance between the housing body 18 and the end portion 54, so that the latter can expand and lift off from the valve-seat element 60 when water flows in the direction of flow S.

Figure 3:
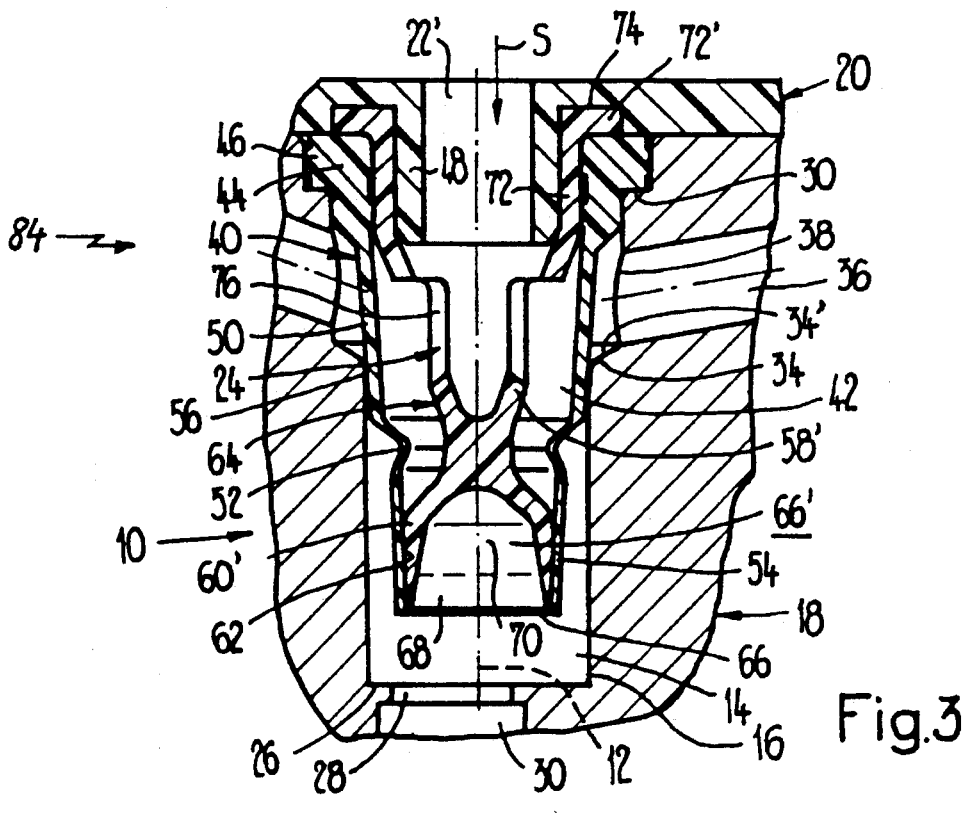
FIG. 3 shows a second embodiment of the safety device according to the invention in a longitudinal sectional view.

The safety device shown in FIG. 3 corresponds essentially to that embodiment shown in FIGS. 1 and 2 and described further above. Identical and like-acting parts are designated in FIG. 3 by the same reference symbols as in FIGS. 1 and 2. Only the differences between the embodiment according to FIG. 3 and the embodiment described further above are therefore set out below. The one-piece constructional part 64 forming the holding part 58, and the valve-seat element 60' is produced from an elastomeric material The valve-seat element 60' of which the outer contour corresponds to that of the valve-seat element 60, especially in the region of the outer surface 62, has a depression 66' on the free end face 66, so that the free edge portion of the valve-seat element 60, forms a soft sealing lip 68. The sealing lip 68 is adjoined by a supporting portion 70 which, as a result of the greater wall thickness, is made fold-resistant and kink-resistant under pressures customary in sanitary systems. Here too, the valve body 40 bears under prestressing with its end portion 54 on the outer surface 62 formed on the supporting portion 70 and on the sealing lip 68.

The holding part 58', adjoining the valve-seat element 60' opposite the direction of flow S is of an essentially tubular design and widens conically as far as the tenon part 48 of the cover element 20 which engages into a cylindrical holding portion 72 of the holding part 58'. Formed on the holding portion 72 at the end located on the same side as the cover is an outer flange 72' which engages behind the fastening end 44 of the valve body 40 and which is held in a corresponding ring-like holding groove 74 encircling the tenon part 48 and located in the cover element 20. The fastening end 44 together with the fastening bolster 46 is prevented from slipping out of the L-shaped fastening groove by the tenon part 48 and by the holding portion 72 arranged between them and having the outer flange 72'.

The cover element 20 has a passage hole 22, which is centric relative to the axis 12 and which opens into the interior of the holding part 58' which is itself connected to the flow channel 42 of the valve body 40 via passage orifices 76 in the wall of the holding part 58'. These passage orifices 76 constitute the inlet orifice 24 of the valve space 14.

The safety devices shown in FIGS. 1 to 3 function as follows: When an equal pressure prevails on the inlet side and outlet side of the safety device, this pressure normally corresponding to the ambient pressure, the valve body 40 bears with some prestressing on the ventilation-valve seat 56 of the housing body 18, with the result being that the ventilation orifice 38 is separated from the outlet orifice 28. Bearing takes place under some prestressing, since the middle portion 50 is pressed inward slightly in the radial direction by the ventilation-valve seat 56. Furthermore, the end portion 54 of the valve body 40 bears under prestressing on the valve-seat element 60, 60'. Any water flowing back into the valve space 14 through the outlet orifice 28, for example because a showerhead, connected to the outlet orifice 28 of the valve space 14 via a hose, is raised above the safety device, consequently cannot run out through the ventilation orifice 38 and the adjoining ventilation channel 36. This property is further assisted by water which is usually present in the flow channel 42 of the valve body 40 and which cannot flow back as a result of a preceding closed valve.

If there is water flow in the direction of flow S, the pressure rises in the flow channel 42 until the end portion 54 of the valve body 40 expands and lifts off from the valve-seat element 60, 60', in order to allow the water to flow to the outlet orifice 28 and the adjoining outflow channel 30. Since, with water flowing, there is always a higher pressure in the flow channel 42 than downstream of the valve-seat element 60, 60', the force with which the middle portion 50 of the valve body 40 is pressed against the ventilation-valve seat 56 is always higher than the force which attempts to lift off the middle portion 50 from the ventilation-valve seat 56. Under water-flow conditions, therefore, it is also safely guaranteed that no water can flow out through the ventilation orifice 38.

If negative pressure builds up on the inlet side of the safety device, which can occur, for example, when a conduit of the feed-water system breaks, the middle portion 50 of the valve body 40 is contracted as a result of this negative pressure in relation to ambient pressure, and the valve body 40 bends inward and thus lifts off from the ventilation-valve seat 56. The outlet orifice 28 is thereby connected to the ventilation orifice 38. The outflow channel 30 is consequently ventilated. The inward bending of the middle portion 50 requires little force, since it must not expand, as seen in the axial direction, and the bead 52 absorbs its change in length virtually without any force. The bead 52 is simply stretched slightly. The prestressing with which the end portion 54 engages around the valve-seat element 60, 60' prevents the possibility that water will penetrate from the outlet orifice 28 into the flow channel 42 and, at the same time, prevents the valve body 40 from being held fixedly on the valve-seat element 60, 60'.

Figure 4:
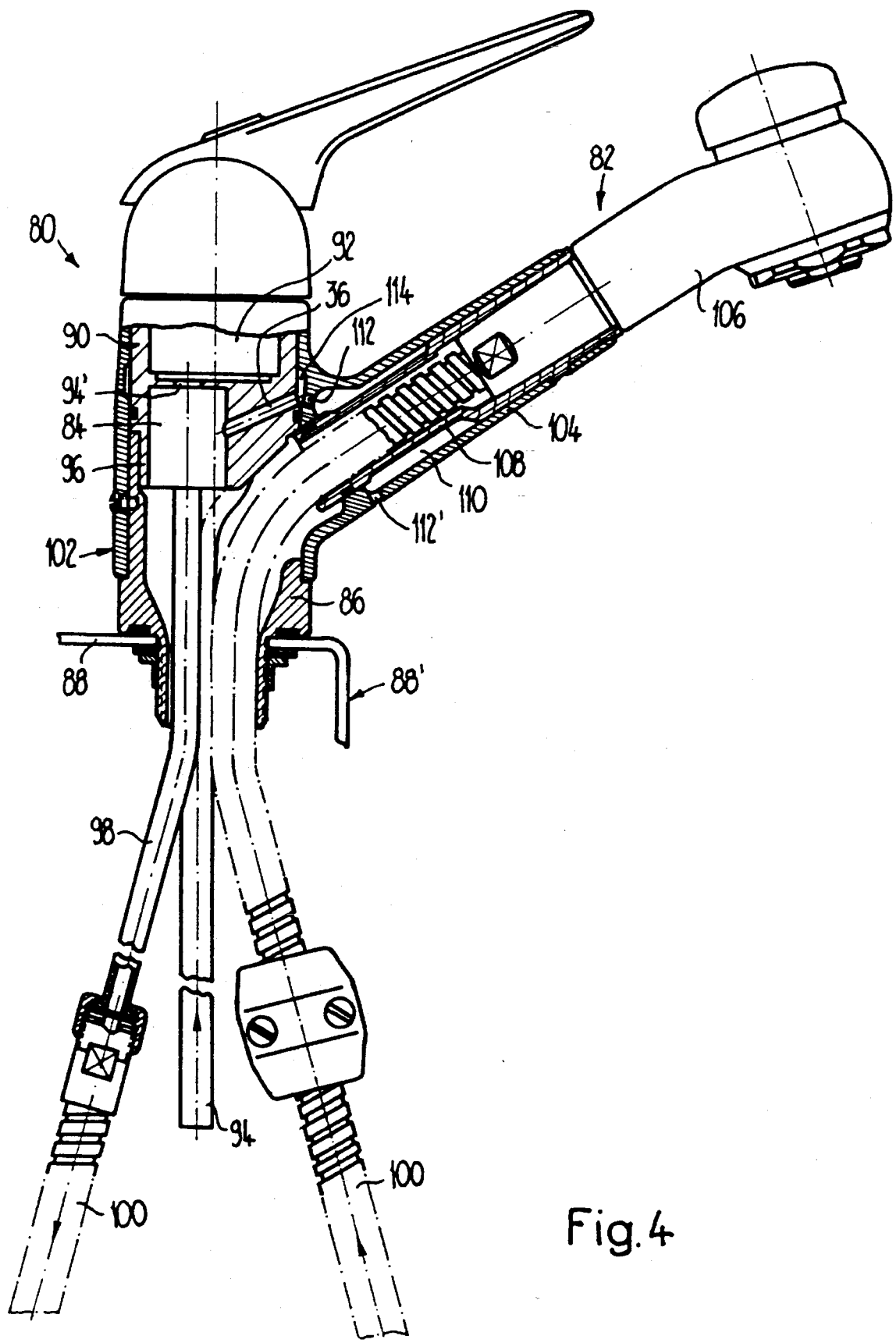
FIG. 4 shows a partially sectional view of a sanitary shower fitting having a safety device according to the invention.

FIG. 4 shows, as an example, a sanitary fitting 80 with a shower hose 82 and a safety device 84, as described further above, which precedes this. A housing lower part 86 of the sanitary fitting 80 is fastened to the edge 88 of a sink 88'. The housing lower part 86 carries a housing upper part 90, in which a generally known single-lever mixer cartridge 92 is arranged. The latter is connected to a hot-water and a cold-water feed conduit 94, of which only one can be seen in FIG. 4. Both the water quantity and the mixing-water temperature are set by means of the single-lever mixer cartridge 92. The water passes through a feed-conduit channel 94, formed on the housing upper part 90 into the housing recess 96 open downwards. A safety device 84 is inserted as a subassembly into this and is retained there.

The ventilation channel 36 extends through the housing upper part 90 and is flow-connected to the ventilation orifice 38 of the valve space 14. There adjoins the outlet orifice 28 an outlet pipe 98 which passes through the housing lower part 86 and to which the hose 100 of the hose shower 82 is fastened below the edge 88 of the sink 88'. Pivotably mounted on the housing lower part 86 and housing upper part 90 is a casing element 102, from which projects a connection piece 104, through which the hose 100 forming a supply loop under the sink 88' runs to the showerhead or outlet 106. The showerhead 106 can be pulled out of the connection piece 104 for flushing purposes.

Inserted into the connection piece 104 is a sleeve 108 which limits between it and the connection piece 104 an annular space 110 which is connected, on the one hand, to the ventilation channel 36 in all the rotary positions of the casing element 102 via a hole 112 and a circumferential groove 114 and, on the other hand, to the ambient air via a hole 112'.

In sanitary fittings of this type in particular, there is the possibility that the showerhead 106 will be immersed in dirty water present in the sink 88, and that a negative pressure will build up in the feed conduit 94, for example as a result of a pipe break, when the single-lever mixer cartridge 92 is open. The safety device 84 prevents the possibility that dirty water will be sucked back into the feed conduit 94, and, at the same time, under back-suction conditions, ventilates the outflow channel 30 which adjoins the outlet orifice 28 and which, in the present case, is formed by the outlet pipe 98 and the hose 100.

Furthermore, in fittings of this type, a water column remains in the supply loop of the hose 100 when the water flow is interrupted by means of the single-lever mixer cartridge 92. When the showerhead 106 is pulled out of the connection piece 104 and raised, the water column presses against the safety device 84. Even under these conditions, the latter prevents this water from running out through the ventilation channel 36.

The construction of the sanitary fitting becomes especially simple when the housing recess 96 directly forms the valve space 14.

Figure 5:
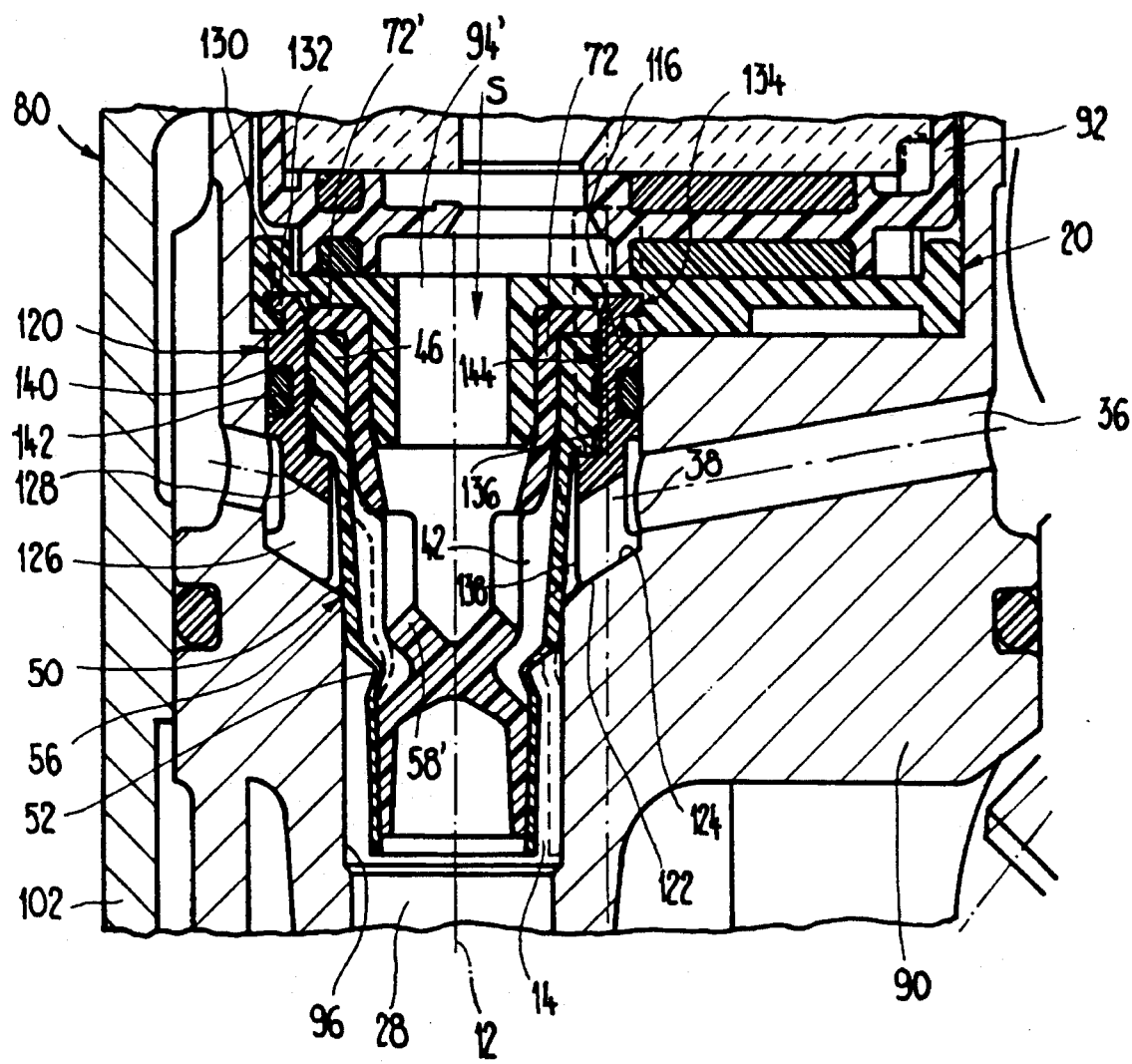
FIG. 5 shows, in longitudinal sectional view, a third embodiment of the safety device according to the invention, installed in the sanitary shower fitting according to FIG. 4.

FIG. 5 illustrates a further embodiment of the safety device according to the invention. As an example, an installation of such a safety device into the sanitary fitting 80 is shown in FIG. 4 and is described in greater detail below. There is, of course, nothing to prevent installation into another sanitary system (into a housing designated as a whole by reference number 10 in FIGS. 1 and 2).

Identical and like-acting parts already known from FIGS. 1 to 4 are once again designated by the same reference numerals.

According to FIG. 5, a supporting and holding sleeve 120 is inserted in a part 116, facing the feed conduit, of the housing recess 96 in the housing upper part 90. The supporting and holding sleeve 120 is connected to the cover element 20 by means of a bayonet fastening 130. The bayonet segments of the supporting and holding sleeve 120 are designated in FIG. 5 by reference number 132, and the cover element 20 is equipped with a corresponding notch 134. The supporting and holding sleeve 120 has a lower conical end face 122 which faces the outlet orifice 28 and which is assigned to a corresponding conical step face 124 of the housing recess 96. The step face 124 corresponds in its arrangement to the second narrowing 34 according to FIGS. 1 and 2. The end face 122 is provided with a number of radially directed slots 126 which are distributed uniformly on the circumference and the bottom 128 of which is made parallel to the end face 122, that is to say likewise conical. An inner circumferential face, surrounding the middle portion 50 of the valve body 40, of the supporting and holding sleeve 120 is designated by reference number 138. The slots 126 are located in the region of the ventilation orifices 38 or of the ventilation channels 36.

The valve body 40 is clamped by means of its fastening bolster 46, together with the outer flange 72' of the tubular holding part 58', between an inner step 136 of the supporting and holding sleeve 120 and the cover element 20 provided with the tenon part 48. The fastening bolster 46 at the same time forms a seal assigned to an inner circumferential face 144 of the supporting and holding sleeve 120 on the one hand and to the cylindrical holding portion 72 of the holding part 58' on the other hand. On the circumference, the supporting and holding sleeve 120 is provided with a groove 140, in which a seal 142 is arranged.

Both the seal 142 and the sealing arrangement of the fastening bolster 46 ensure that no feed-conduit water can pass outwards and into the ventilation channels 36.

In the embodiment illustrated in FIG. 5, in the event of strong water flow or if water is supplied under high pressure, the radial outward widening of the middle portion 50, which can also lead to axial variations and possible chafing in the region of the ventilation-valve seat 56, is limited by the circumferential face 138 of the supporting and holding sleeve 120. The middle portion 50 also cannot be pressed into the ventilation orifices 38, where it could likewise be exposed to possible damage. When it widens radially, the middle portion 50 of the valve body 40 is carefully supported on the circumferential face 138, and the risk of damage is eliminated. In the right-hand half of FIG. 5, the maximum possible widening of the valve body 40 in the event of overpressurize in the flow channel 42 is represented by broken lines. It can be seen from this that the radial widening of the lower end portion 54 is limited by the inner circumferential face of the housing recess 96.

In the event of a pronounced negative pressure on the inlet side, for example when there is a break in the feed conduit, in an extreme case the valve body 40 can assume the position represented by broken lines in the left-hand half of FIG. 5. In this case, the middle portion 50 would come to bear on the holding part 58'. However, under lower negative pressures, the valve body 40 merely contracts inward slightly, as already described, without assuming the extreme position. If there is any negative pressure, the presence of the slots 126 guarantees a perfect ventilation of the outflow channel 30.

The use of the bayonet fastening 130 allows an especially simple mounting of the supporting and holding sleeve 120, receiving the valve body 40 and the holding part 58', in the cover element 20. However, another releasable form of connection would be perfectly possible.

In all the embodiments of the safety device according to the invention, a plurality of successive beads can also be present instead of the single bead 52, so that the valve body has a concertina-like portion between the middle portion 50 and the end portion 54.

The outer surface 62 of the valve-seat element 60, 60' and the end portion 54 of the valve body can also have a cylindrical shape.

It is also possible, of course, to install the safety device into a conduit, for example between the outlet pipe 98 and the hose 100.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A sanitary safety device for a sanitary fitting for preventing the backflow of water into a feed conduit, which comprises:

a housing which surrounds a valve space and which has an inlet orifice connected to the feed conduit, an outlet orifice and a ventilation orifice, a sleeve-shaped valve body made of an elastomeric material, which is positioned in the valve space, and a flow channel surrounded by the valve body wherein the flow channel is connected to the inlet orifice and the valve body is sealingly fastened by a fastening end to the housing, a valve-seat element which is connected to the housing and which is surrounded in a sleeve-like manner by a free end portion of the valve body remote from the fastening end and on which the valve body bears with the free end portion when one of a water flow interruption occurs and a negative pressure prevails on the inlet side, and from which the valve body is spaced in the event of water flow, and a ventilation-valve seat which is fixed relative to the housing and on which the valve body bears with an outer surface in the event of water flow, in order to prevent water from flowing out through the ventilation orifice, and from which the valve body is lifted off when negative pressure prevails on the inlet side, in order to ventilate the outlet orifice, wherein the valve-seat element is of fold-resistant design, and the valve body bears under prestressing on the valve-seat element when the water flow is interrupted, has a continuous bead upstream of the free end portion cooperating with the valve-seat element and, when the water flow is interrupted, bears on the ventilation-valve seat with a middle portion thereof located upstream of the bead, in order to separate the ventilation orifice from the outlet orifice, and lifts off from the ventilation-valve seat in order to ventilate the outlet orifice, only when negative pressure prevails on the inlet side.

2. The safety device as claimed in claim 1, wherein the valve-seat element has a sealing outer surface which is one of being substantially cylindrical and tapered conically, as viewed in the direction of flow, and which cooperates with the end portion of the valve body.

3. The safety device as claimed in claim 2, wherein the valve-seat element comprises elastomeric material and has a fold-resistant supporting portion on a soft sealing-lip portion adjoining the supporting portion, wherein the sealing outer surface is formed on the supporting portion and the sealing-lip portion.

4. The safety device as claimed in claim 1, wherein the valve-seat element has a holding part which extends in the flow channel and which is fastened to the housing on the side of the fastening end of the valve body facing away from the end portion.

5. The safety device as claimed in claim 1 wherein the valve body has, at the fastening end, a continuous fastening bolster, and the middle portion located between the latter and the bead is of a conical shape.

6. The safety device as claimed in claim 1, wherein the valve space is rotationally symmetrical relative to the axis of the valve body, in a circumferential direction and the ventilation-valve seat is formed continuously on the housing between the ventilation orifice and the outlet orifice.

7. The safety device as claimed in claim 1, wherein a supporting and holding sleeve is located in the housing which surrounds the middle portion of the valve body and which is provided, in the region of the ventilation orifice, with at least one slot connecting the valve space to the ventilation channel.

8. The safety device as claimed in claim 7, which comprises a cover element for the housing wherein the supporting and holding sleeve is connected to the cover element by a bayonet fastening.

9. The safety device as claimed in claim 8, which comprises a fastening bolster for clamping the valve body, together with an outer flange of a holding part of the valve-seat element, between an inner step of the supporting and holding sleeve and the cover element.

10. The safety device as claimed in claim 7, wherein the supporting and holding sleeve is provided, on an end face thereof facing the outlet orifice, with a plurality of radially directed slots which are distributed uniformly on the circumference.

11. A sanitary fitting which comprises:

a fitting housing, a control cartridge, which is arranged on the fitting housing and connected on an inlet side to a feed conduit and which is connected on an outlet side to a water outlet via an outflow channel, said control cartridge setting the water quantity flowing from the feed conduit to the water outlet and the water temperature, and a safety device which comprises:

a housing which surrounds a valve space, and which has an inlet orifice connected to the feed conduit, an outlet orifice and a ventilation orifice, a sleeve-shaped valve body made of an elastomeric material, which is positioned in the valve space, and a flow channel surrounded by the valve body wherein the flow channel is connected to the inlet orifice and is sealingly fastened by a fastening end of the valve body to the housing, a valve-seat element which is connected to the housing and which is surrounded in a sleeve-like manner by a free end portion of the valve body remote from the fastening end and on which the valve body bears with the free end portion when one of a water flow interruption occurs and a negative pressure prevails on the inlet side, and from which the valve body is spaced in the event of water flow, and a ventilation-valve seat which is fixed relative to the housing and on which the valve body bears with an outer surface of the ventilation valve seat in the event of water flow, in order to prevent water from flowing out through the ventilation orifice, and from which the valve body is lifted off when negative pressure prevails on the inlet side, in order to ventilate the outlet orifice, wherein the valve-seat element is of a fold-resistant design, the valve body bears under prestressing on the valve-seat element when the water flow is interrupted, has a continuous bead upstream of the free end portion cooperating with the valve-seat element and, when the water flow is interrupted, bears on the ventilation-valve seat with a middle portion thereof located upstream of the bead, in order to separate the ventilation orifice from the outlet orifice, and lifts off from the ventilation-valve seat in order to ventilate the outlet orifice, only when negative pressure prevails on the inlet side, and the valve space of the safety device is arranged in the fitting housing, and the inlet orifice is connected to the control cartridge via a first portion, formed on the fitting housing, of the outflow channel, the outlet orifice is connected to the water outlet via a second portion of the outflow channel, and the ventilation orifice is connected to ambient air via a ventilation channel formed on the fitting housing.

12. The sanitary fitting as claimed in claim 11, which comprises a shower hose forming the second portion of the outflow channel.

* * * * *